Aug. 28, 1956  E. P. SMITH  2,761,039
FEEDER TAP
Filed Jan. 5, 1955
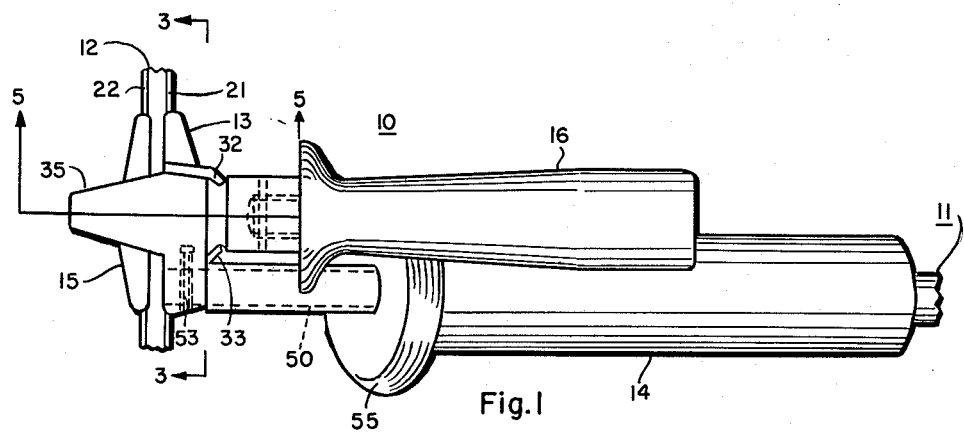
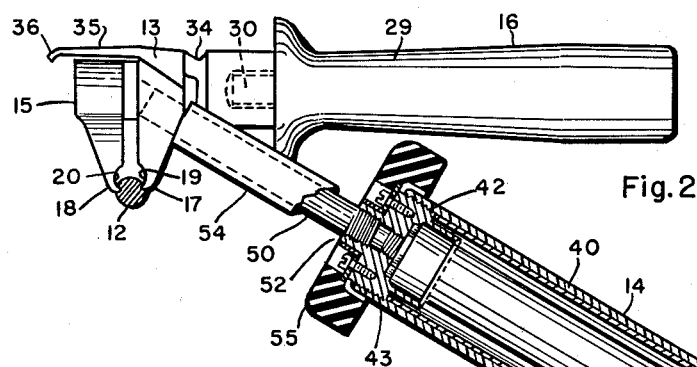
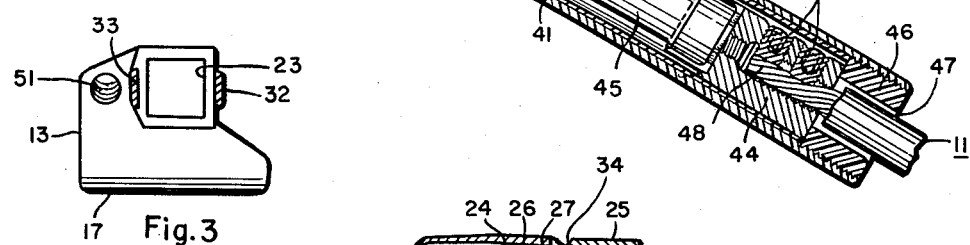
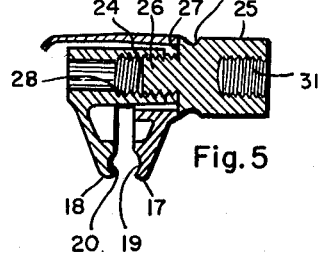
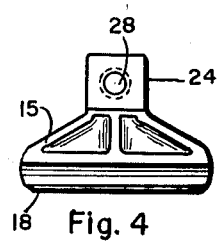
INVENTOR.
EDWARD P. SMITH.
BY
Kenneth W. Miller
AGENT.

United States Patent Office 2,761,039
Patented Aug. 28, 1956

2,761,039

FEEDER TAP

Edward P. Smith, Mansfield, Ohio, assignor to The Ohio Brass Company, Mansfield, Ohio, a corporation of New Jersey Application January 5, 1955, Serial No. 480,034

7 Claims. (Cl. 200—115.5)

This invention relates to electrical connectors and more specifically to feeder taps for trolley wires and the like.

It is a principal object of the invention to minimize the danger of electrical shock which may be incurred while connecting feeder cables and the like to live electric wires.

Another object of the invention is to provide a feeder tap which is particularly adapted for use with trolley wires and which may be used continuously while trolley cars are passing along the trolley wire to which the tap is connected.

Still another object of the invention is to provide a trolley tap which is rugged and adapted to stand the abuse usually encountered in mining operations and the like.

In the art relating to live wire connectors, two general kinds of tap means, generally designated as feeder taps, have heretofore been employed for connecting the feeder cable to the live wire. The feeder taps have generally been constructed and arranged so that the connection is made to the live wire either by clamping two jaws into engagement with the wire or by suspending a hook shaped member over the wire. In the first kind of tap, the electrical contact between the jaws and the wire is achieved by clamping the jaws against the wire either by means of a screw threaded arrangement or by means of a spring. The second kind of tap depends for the contact between the hook shaped member and the wire upon the pressure brought about by the weight of the tap and the depending portions of the feeder cable.

In using such taps for connecting feeder cable to trolley wires, the suspension tap suffers the disadvantage that the tap cannot be used while a trolley car is passing the location at which the tap is being used. The spring held clamping taps have generally suffered this same limitation inasmuch as the spring arrangement is usually employed merely to increase the contact between the tap and the trolley wire and cannot exert sufficient pressure to hold the trolley tap away from the path of the trolley shoe or collector. The screw type clamping taps, while overcoming the disadvantage of the suspension and spring held tap, suffered other limitations. Particularly, it has been necessary for workmen to hold the body of the tap manually while tightening the screw clamp and, since this usually involves reaching about the trolley wire, there is some danger of contacting the live wire.

According to my present invention, I have devised a clamping feeder tap in which the holding and clamping functions have been separated. That is, I provide one handle for holding the jaws of the tap in place against the trolley wire, and a second separate handle for clamping the jaws together in engagement with the trolley wire. In this way, I have been able to achieve all of the advantages of the suspension tap while retaining all of the advantages of the screw type clamping tap.

While the features of the novel trolley tap render it particularly advantageous for use with trolley wires, nevertheless those features are employed to advantage when the tap is used with other feeder cables, live wires, and generally as a connector wherever electrified devices are involved.

The invention, together with further features, objects and advantages thereof will be more clearly apparent from a consideration of the folowing detailed specification and claims, taken in connection with the appended drawing, in which:

Fig. 1 is a top view of the trolley wire tap of the invention;

Fig. 2 is an elevation view;

Fig. 3 is a view of the fixed jaw taken in the direction 3—3 in Fig. 1;

Fig. 4 is a view of the movable jaw taken from the fixed jaw side thereof; and

Fig. 5 is a section view taken in the direction 5—5 in Fig. 1 illustrating particularly the arrangement of the clamping handle with respect to the two jaws.

Referring now to Figs. 1 and 2, the feeder tap 10 of the invention is adapted to connect a feeder cable 11 to a trolley wire 12. The trolley wire 12 ordinarily forms part of a trolley system such as is used in mines and the like, while the feeder cable 11 is connected to electric motor driven tools or appliances which are ordinarily used in connection with the mine operations.

The feeder tap 10 comprises a fixed jaw 13, which is held by means of a holding handle 14, and a movable jaw 15, which is moved toward and away from the fixed jaw 13 by means of a clamping handle 16. The jaws 13 and 15 have elongated lower portions 17 and 18 which, with recesses 19 and 20 along the lower inside surfaces thereof, form complementary wire gripping portions of the jaws. The lower portions of the jaws are adapted to grip either the body of the trolley wire, or only the upper portion of the wire formed by the recesses 21 and 22, so that the jaws do not obstruct the collector shoe of a passing trolley. Where the tap is employed to make connection to the usual feeder cable, the cable may be received in the recesses 19 and 20.

As is shown also in Figs. 3, 4 and 5, the body portion of the fixed jaw 13 is formed with a rectangular opening 23 and is adapted to receive a rectangular shank 24 which projects from the inside face of the movable jaw 15. The shank 24 is guided and restrained by the fixed jaw 13 so that the two jaws are maintained with the opposing faces in complementary relationship.

The clamping handle 16 includes a shank portion 25 which has a part 26 thereof extending from the end face 27 of the shank and is received in a threaded opening 28 in the shank 24 of the movable jaw 15. A grip 29 of suitable insulating material has a stud 30 at the end thereof received in a threaded opening 31 in the shank 25. The handle is retained in position against the fixed jaw 13 by two pieces 32 and 33 which extend from the body of the fixed jaw 13 and project into a circumferential recess 34 formed in the body of the shank 25 adjacent the face 27 thereof.

The movable jaw 15 is retained in position with the shank 24 in the opening 23 by means of a piece 35 which projects from the upper part of the body of the fixed jaw 13 and has the outer end 36 thereof inclined inward toward the movable jaw.

The holding handle 14 comprises an outer sleeve 40 of suitable insulating material such as fiber or the like. Sleeve 40 has an asbestos lining member 41 which is fitted within the sleeve 40 while a metallic plug 42 is threaded into the sleeve 40 at the inner end 43 thereof. A cable connector 44 is received in the outer end of the lining 41 and is pressed against a fuse 45 by means of an insulating bushing 46 threaded into the outer end of the sleeve 40. The bushing 46 has an internal opening 47 for receiving the feeder cable 11 which has a conductor 48 thereof held by the set screws 49 of the connector 44.

The fixed jaw 13 is supported from the handle 14 by means of a metallic rod 50 which is received in a threaded opening 51 in the fixed jaw at the inner end of the rod. The outer end of the rod is received in a threaded opening 52 in the plug 42 and is tightened into place while the rod is locked in position against the fixed jaw by means of a roll pin 53. The rod 50 is covered with an insulating sleeve 54 to guard particularly against contact with the rod while the handle 16 is being operated.

The opening 51 in the fixed jaw 13 and the rod 50 are inclined downward with respect to the axis of the clamping handle 16 to accommodate a guard 55 at the inner end of the handle 14. The guard 55 is formed of hard rubber or other suitable insulating material, and may be held in one hand while the sleeve 40 is unscrewed from the plug 43 for the purpose of replacing the fuse 45. The outer portion of the guard 55 extends downward over the outside of the sleeve 40 and may be spaced from the outer sleeve or contact the sleeve lightly in order to minimize the danger of shock as set forth in my previous Patent 2,657,290 dated October 27, 1953.

In use, the feeder tap 10 is held by handle 14 and the jaws 13 and 15 are brought into the proper position with respect to the trolley wire 12 by manipulating the handle 16. The handle 16 may then be turned until the lower portions 17 and 18 of the jaws engage the trolley wire in the desired fashion. It will be seen that firm positive contact between the engaging portions of the jaws and the trolley wire may be obtained with a minimum effort and that there is no need for the operator to approach the trolley wire either while applying or while removing the tap.

It is to be understood that the foregoing description is not intended to restrict the scope of the invention and that various rearrangements of the parts and modifications of the design may be resorted to, giving effect to a liberal interpretation of the claims as herein set forth.

I claim:

1. A detachable feeder tap comprising a fixed jaw and a movable jaw having complementary trolley wire gripping portions, an opening transversely through the fixed jaw and a shank on the movable jaw received in the opening in the fixed jaw, a clamping handle having a shank portion engaged with the fixed jaw and a threaded portion extending into the opening and threadably engaged with the shank of the movable jaw, and a holding handle comprising an insulating member and support means for the insulating member affixed to the fixed jaw, a cable connector within the insulating member and an opening in the insulating member at the end away from the fixed jaw for receiving a feeder cable, and electrically conductive means from the connector to the fixed jaw.

2. A detachable feeder tap comprising a fixed jaw and a movable jaw having complementary trolley wire gripping portions, a rectangular opening transversely through the fixed jaw and a rectangular shank on the movable jaw fitted in the opening in the fixed jaw, a clamping handle having a shank portion engaged with the fixed jaw and a threaded portion extending into the opening and threadably engaged with the rectangular shank of the movable jaw, a circumferential recess in the shank and a piece on the fixed jaw, projecting into the recess for retaining the clamping handle, a holding handle comprising an insulating member and support means for the insulating member affixed to the fixed jaw, a cable connector within the insulating member and an opening in the insulating member at the end away from the fixed jaw for receiving a feeder cable, and electrically conductive means from the connector to the fixed jaw.

3. A detachable feeder tap comprising a fixed jaw and a movable jaw having complementary wire gripping portions, and an opening through the fixed jaw and a shank on the movable jaw received in the opening of the fixed jaw, a clamping handle having a shank portion engaged with the fixed jaw and a threaded portion extending into the opening and threadably engaged with the shank of the movable jaw, the said opening through the fixed jaw and the said shank on the movable jaw having complementary portions thereof offset from the axis of rotation of the clamping handle so as to prevent rotation of the movable jaw relative to the fixed jaw, a circumferential recess in the shank and a piece on the fixed jaw projecting into the recess for retaining the clamping handle, a holding handle comprising an insulating member and support means for the insulating member affixed to the fixed jaw, and means for connecting a feeder cable to one of the said jaws.

4. A detachable feeder tap for trolley wires, comprising a fixed jaw and a movable jaw having complementary trolley wire gripping portions, a rectangular opening transversely through the fixed jaw and a rectangular shank on the movable jaw fitted in the opening in the fixed jaw, a clamping handle having a shank portion engaged with the fixed jaw and a threaded portion extending into the opening and threadably engaged with the rectangular shank of the movable jaw, a circumferential recess in the shank and a fixed piece on the fixed jaw projecting into the recess for retaining the clamping handle, a threaded opening in the fixed jaw away from the clamping handle and a metallic rod received in the said threaded opening at one end of the rod, and a holding handle including an insulating member carried on the outer end of the rod, a cable connector within the handle for receiving a feeder cable and means electrically connecting the connector to the rod.

5. A detachable feeder tap for trolley wires comprising a fixed jaw and a movable jaw having complementary trolley wire gripping portions, a rectangular opening transversely through the fixed jaw and a rectangular shank on the movable jaw fitted in the opening in the fixed jaw, a clamping handle having a shank portion engaged with the fixed jaw and a threaded portion extending into the opening and threadably engaged with the rectangular shank of the movable jaw, a circumferential recess in the shank and a fixed piece on the fixed jaw projecting into the recess for retaining the clamping handle, a threaded opening in the fixed jaw away from the clamping handle and a metallic rod received in the said threaded opening and a holding handle at the outer end of the rod comprising an insulating sleeve with a metallic plug toward the inner end thereof threaded on the rod, and a cable connector toward the outer end of the sleeve, a fuse between the plug and the cable connector and an annular bushing threaded in the outer end of the sleeve for clamping the cable connector against the fuse and receiving the feeder cable.

6. A detachable feeder tap for trolley wires comprising a fixed jaw and a movable jaw having complementary trolley wire gripping portions, a rectangular opening transversely through the fixed jaw and a rectangular shank on the movable jaw fitted in the opening in the fixed jaw, a clamping handle having a shank portion engaged with the fixed jaw and a threaded portion extending into the opening and threadably engaged with the rectangular shank of the movable jaw, a circumferential recess in the shank and a fixed piece on the fixed jaw projecting into the recess for retaining the clamping handle, a threaded opening in the fixed jaw away from the clamping handle and a metallic rod received in the said threaded opening and angularly spaced from the clamping handle, and a holding handle at the outer end of the rod comprising an insulating sleeve with a metallic plug toward the inner end thereof threaded on the rod, and a cable connector toward the outer end of the sleeve, a fuse between the plug and the cable connector and an annular bushing threaded in the outer end of the sleeve for clamping the cable connector against the fuse and receiving the feeder cable, and an annular guard member of insulating material at the inner end of the insulating sleeve.

7. The invention in accordance with claim 6, the said guard member being supported by the metallic plug at the inner end of the sleeve and extending over the sleeve to prevent short circuit between the plug and the outer surface of the sleeve.

References Cited in the file of this patent

UNITED STATES PATENTS

| | | |
|---|---|---|
| 1,594,925 | Chandler | Aug. 3, 1926 |
| 2,233,826 | Allison | Mar. 4, 1941 |
| 2,657,290 | Smith | Oct. 27, 1953 |